T. H. WICKENDEN.
VEHICLE SPRING.
APPLICATION FILED JULY 16, 1919.

1,371,284.

Patented Mar. 15, 1921.

INVENTOR
Thomas H. Wickenden.
BY
Stewart & Perry
ATTORNEYS

UNITED STATES PATENT OFFICE.

THOMAS H. WICKENDEN, OF SOUTH BEND, INDIANA, ASSIGNOR TO THE STUDEBAKER CORPORATION, A CORPORATION OF NEW JERSEY.

VEHICLE-SPRING.

1,371,284.  Specification of Letters Patent.  Patented Mar. 15, 1921.

Application filed July 16, 1919. Serial No. 311,210.

*To all whom it may concern:*

Be it known that I, THOMAS H. WICKENDEN, a citizen of the United States of America, and resident of South Bend, in the county of St. Joseph and State of Indiana, have invented certain new and useful Improvements in Vehicle-Springs, of which the following is a specification.

This invention relates to vehicle springs, and the object of the invention is to provide an improved construction wherein the spring is highly sensitive under relatively light loads but is automatically stiffened or rendered more rigid when subjected to relatively greater or heavier loads.

Devices of this general character have been heretofore suggested but in practically every instance have been so constituted that, as the load is increased, the spring is constantly proportionately stiffened through a continuously increasing contact of the spring with one of the body members of the vehicle so that under the maximum load the spring will be substantially straightened out, whereas in its normal condition it partakes of a substantially semi-elliptical form. Such a spring is usually supported beneath a transverse bar of the body of the vehicle and, under the maximum load, substantially the entire length of the spring is flattened out against the under surface of such bar.

The object of the present invention is to provide a construction of the general character aforesaid and to so construct such a spring that, under light loads, it will possess the desired sensitiveness, but, after the load has been increased to a predetermined extent will, at this crucial point, be given new points of engagement with the portion of the vehicle with which it is associated so as to be suddenly stiffened without necessitating the flattening out of the spring in the manner described with reference to prior devices. The advantages of such construction is that the spring will, at all times, partake of its semi-elliptical form and will be better able to stand the strains and shocks to which it is subjected.

Features of the invention, other than those specified, will be apparent from the hereinafter detailed description taken in conjunction with the accompanying drawings.

In the accompanying drawings I have illustrated one practical embodiment of the invention, but the construction therein shown is to be understood as illustrative only, and not as defining the limits of the invention.

Figure 1:
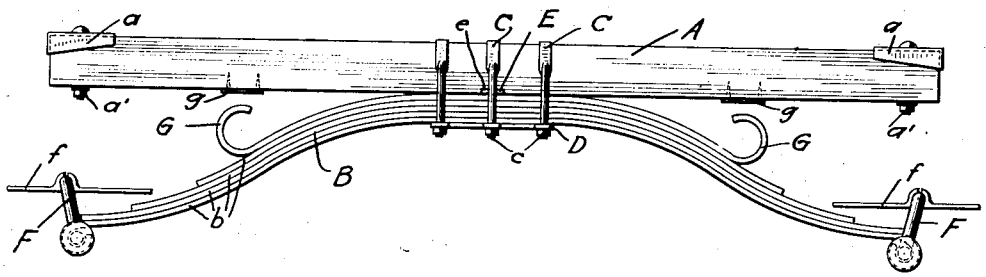
Figure 1 is a face view of vehicle construction, embodying the present invention, the parts being shown in positions which they partake under a light load.

Referring to the drawings A and A' designate what may be broadly termed load carrying members forming part of the body or frame of a vehicle. These members may be made as a single, relatively wide, member but, as shown, they are in the form of two parallel bars extending transversely of the vehicle and spaced apart by plates $a$ positioned adjacent the opposite ends of said bars and secured thereto by bolts $a'$. The bars A and A' may be a part of the body or may constitute a subjacent load carrying element properly secured to the body in any desired manner.

Positioned beneath and supporting each of the load carrying members A are a pair of substantially semi-elliptical springs B and B', each of which is built up of a plurality of leaves $b$ and $b'$ in the usual manner. Each of these springs is secured at its center to the corresponding load carrying member at its center by means of a plurality of yokes C which straddle the individual members and have threaded stems adapted to receive nuts $c$. A plate D is positioned beneath each spring, the stems of the yokes C pass through apertures in said plate, and, when the nuts are tightened, serve to clamp the springs tightly between the load carrying members and the plates D. To preclude shifting of the springs longitudinally of the load carrying members, each spring is provided at its center with an upwardly projecting lug E which is seated in a depression or pocket $e$ formed in the under surface of each load carrying member, and through the connections described, each spring is tightly secured both against lateral and longitudinal movement to its respective load carrying member. I may of course employ other means of securing the spring to the load carrying member.

The opposite ends of the springs are pivotally secured to stirrups F which, in turn, are pivotally mounted intermediate the springs on plates *f* secured in any suitable manner to the axle of the vehicle. As shown in the drawings the plates *f* carry the stirrups at their centers and such stirrups are bent downwardly into the form of cranks at the opposite sides of each plate and to these cranks the ends of the springs are secured. This allows of the plates being rigidly secured to the axle, while the pivotal connections between the plates and the stirrups, and the stirrups and the springs allow of the flexing of the latter. The spring as disclosed is intended primarily as a bolster spring and is mounted on the vehicle bolster rather than on the axle although mounting on the axle is entirely feasible.

In carrying out the present invention in the structure described, each end of the uppermost leaf of each spring is returned upon itself to form an upstanding scroll G as clearly shown in Fig. 1, and positioned directly above the scrolls G are wearing plates *g* which are secured to the under sides of the load carrying members in any suitable manner. The employment of these plates is advisable when the load carrying members are of wood but, if these members are of metal, the plates *g* may be dispensed with, their function being merely to take the wear due to contact with the scrolls G, when the weight imposed upon the load carrying members is sufficient to flex the springs sufficiently to bring the scrolls into engagement with the load carrying members or the wearing plates *g* fixed thereto.

Figure 2:
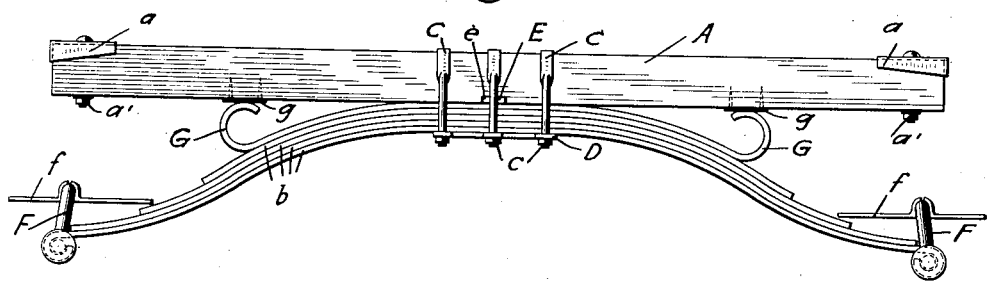
Fig. 2 is a view similar to Fig. 1 but showing the positions of the parts under a relatively heavy load, and, Fig. 3 is a side elevation of the parts as shown in Fig. 1.
Figure 3:
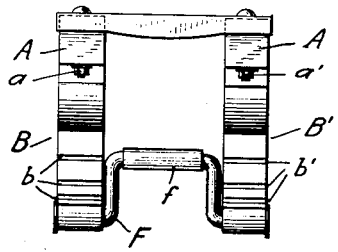

The normal position of the parts when carrying their relatively light load is as shown in Fig. 1, wherein the weight of the load carrying members is carried by the springs at the centers thereof and the scrolls are free from engagement with said members. In practice the springs are made relatively light so that, under light loads, they will be sufficiently sensitive to render the vehicle very easy riding. However, as the load is increased to such extent that it would be too great for springs of the given weight and span to properly carry, the springs will be flexed to bring the scrolls into engagement with the load carrying members after the manner shown in Fig. 2, with the result that the span of each spring is, figuratively speaking, automatically shortened so that its capacity per inch is very greatly increased. In carrying out the present invention the fact that the scrolls come into contact with the load carrying members some distance from the center thereof, not only allows of the employment of lighter springs, with consequent easier riding under light loads, but it is further possible to use lighter load carrying members than have formerly been employed. This is for the reason that when the springs are loaded heavily, with the scrolls in contact with the load carrying members, the leverage of said members is but practically half that which is imposed by springs of the well known type.

Another advantage in the construction shown of the prior devices is that sidesway of a load is minimized as such sidesway is checked through the engagement of the scrolls with the load carrying members and in no instance allowed to become serious. This feature is of particular importance in dealing with shifting loads such, *e. g.*, as a tank of water on a street sprinkler.

In the embodiment of the invention hereinbefore described and shown in the drawings the two springs are positioned side by side, and in spaced relation to one another, and both of these springs coöperate with one another to support the load carrying members from the axle. However, it will be understood that the present invention is not restricted to the use of a pair of coöperating springs as illustrated but that, in many instances, a single spring may be employed. It will thus be manifest that mechanical and formal changes, such as that described, and the substitution of equivalents, may be made in the structure without departing from the spirit or substance of this invention, the scope of which is commensurate with the appended claims.

Having thus fully described the invention, what I claim as new, and desire to secure by Letters Patent is:

1. In a device of the character described, a load carrying member, a substantially semi-elliptical spring embodying a plurality of leaves positioned subjacent the load carrying member and extending longitudinally thereof with the central portion of the spring tightly bound to the central portion of the load carrying member, the uppermost leaf of the spring being provided at its opposite ends with upstanding scrolls normally free from engagement with the load carrying member but adapted to engage therewith when the load carrying member is subjected to heavy loads, and while the central portion of the spring is maintained tightly bound to the load carrying member, for the purpose of automatically shortening the span of the spring and increasing its capacity to carry the increased load, and means at the opposite ends of the spring for associating it with the axle of a vehicle.

2. In a device of the character described, an axle, a load carrying member positioned above the axle, a spring embodying a plurality of leaves secured at its opposite ends to the axle and firmly and permanently bound at its center to the load carrying member, the opposite ends of the uppermost leaf being formed into upstanding projections normally free from engagement with the load carrying member but adapted to engage therewith when the load carrying member is subjected to heavy loads, and while the center of the spring is maintained firmly bound to the load carrying member, for the purpose of automatically shortening the span of the spring and increasing its capacity to carry the increased load.

Signed by Thomas H. Wickenden at South Bend, Indiana, this 16th day of June, 1919.

THOMAS H. WICKENDEN.

Witnesses:
 JOHN F. COTTER,
 A. H. KERNDT.